(12) United States Patent
Kobylanska et al.

(10) Patent No.: US 6,515,070 B2
(45) Date of Patent: Feb. 4, 2003

(54) LOW-TEMPERATURE, HEAT-ACTIVATED ADHESIVES WITH HIGH HEAT RESISTANCE PROPERTIES

(75) Inventors: Irina Kobylanska, Stamford, CT (US); David M. Konkus, Yonkers, NY (US); David A. Iey, New Canaan, CT (US)

(73) Assignee: Cytec Technology Corp., Wilmington, DE (US)

( * ) Notice: Subject to any disclaimer, the term of this patent is extended or adjusted under 35 U.S.C. 154(b) by 0 days.

(21) Appl. No.: 09/954,943

(22) Filed: Sep. 18, 2001

(65) Prior Publication Data

US 2002/0068792 A1 Jun. 6, 2002

Related U.S. Application Data

(60) Provisional application No. 60/234,307, filed on Sep. 21, 2000.

(51) Int. Cl.$^7$ .............................. C08J 3/00; C08K 3/20; C08L 75/00; C08G 18/00; C08G 18/30
(52) U.S. Cl. ........................ 524/589; 524/590; 524/591; 524/839; 524/840; 528/44; 528/60; 528/61; 528/65; 528/85
(58) Field of Search ................................ 524/591, 839, 524/840, 589, 590; 528/44, 60, 61, 65, 85

(56) References Cited

U.S. PATENT DOCUMENTS

| | | | |
|---|---|---|---|
| 4,147,679 A | 4/1979 | Scriven et al. | 260/29.2 TN |
| 4,528,323 A | 7/1985 | Lorenz et al. | 524/839 |
| 4,558,090 A | 12/1985 | Drexler et al. | 524/591 |
| 4,914,148 A | 4/1990 | Hille et al. | 524/507 |
| 5,155,163 A | 10/1992 | Abeywardena et al. | 524/591 |
| 5,432,228 A | 7/1995 | Hilken et al. | 524/591 |
| 5,494,960 A | 2/1996 | Rolando et al. | 524/591 |
| 5,608,000 A | 3/1997 | Duan et al. | 524/591 |
| 5,703,158 A | 12/1997 | Duan et al. | 524/840 |
| 5,817,733 A | 10/1998 | Rink | 528/71 |
| 5,907,012 A | 5/1999 | Voss et al. | 524/591 |
| 5,912,299 A | 6/1999 | Tomko et al. | 524/840 |

FOREIGN PATENT DOCUMENTS

WO    WO 95/08583    3/1995

OTHER PUBLICATIONS

"TMXDI® (Meta) Aliphatic Isocyanate, The Choice for Aqueous Polyurethane Dispersions" (Dec. 1999) pp.1–32.
"Aqueous Emulsions, Dispersions and Solutions of Polyurethanes; Synthesis and Properties" Progress in Organic Coatings 9 (1981) pp. 281–340.
"TMXDI® (META) Aliphatic Isocyanate" pp. 1–12.

Primary Examiner—Patrick D. Niland
(74) Attorney, Agent, or Firm—James A. Jubinsky; Claire M. Schultz; Valerie T. Didamo

(57) ABSTRACT

The present invention is directed to a polymer component having controlled branching, formed from the reaction product of a prepolymer and a chain extender, which prepolymer is itself formed from the reaction product of a mixture of a non-self-associating isocyanate component, a diol component having a molecular weight from about 1500 to 6000 grams/mole and present in an amount greater than about 50% by weight based on the total weight of the prepolymer, and an ion-forming compound, where the chain extender includes an amine-containing compound and is present in an amount sufficient to react with at least about 99% of the isocyanate groups present after the prepolymer has been formed, wherein the controlled branching of the polymer includes at least one of:

a hydroxy-functional component having hydroxyl functionality greater than 2.0 and a molecular weight from about 700 to 2000; or a low molecular weight component having more than two hydroxyl groups. Methods of making and using such dispersion compositions are also included.

22 Claims, No Drawings

LOW-TEMPERATURE, HEAT-ACTIVATED ADHESIVES WITH HIGH HEAT RESISTANCE PROPERTIES

This application claims the benefit of pending U.S. Provisional Application No. 60/234,307, filed Sep. 21, 2000.

FIELD OF THE INVENTION

The present invention relates to a polymer component having controlled branching and which is suitable to be used as an adhesive. In the case of polyurethane or polyurethaneurea polymers, controlled branching can be achieved through the incorporation of polyfunctional components into the polymer forming or prepolymer forming reaction.

BACKGROUND OF THE INVENTION

There has been significant interest in the development of solvent-free aqueous polyurethane dispersions for a number of industrial applications, including adhesives, coatings, and inks. The high viscosity of the intermediate prepolymers usually requires that a viscosity-reducing agent, for example, such as a solvent, be added prior to the dispersion step. See, e.g., Dieterich, D., *Progress in Organic Coatings*, 9, 281 (1981).

The use of certain isocyanate components, such as TMXDI®, (m-tetramethylxylylene diisocyanate, a trademark of Cytec Industries), that do not undergo self-condensations typical of other conventional isocyanate components can be incorporated into preparations, allowing lower viscosity prepolymers to be made without necessarily adding any viscosity-reducing agents. Several publications listed below have utilized TMXDI in adhesive formulations, some with viscosity-reducing agents, such as organic solvents.

U.S. Pat. No. 5,432,228 to Hilken et al., discloses adhesive compositions and processes for bonding substrates together using the adhesive compositions. The compositions are made by a process combining a prepolymer reaction product of an organic isocyanate, a polyhydroxyl compound, and a low molecular weight polyhydric alcohol or aminoalcohol, with a mixture of monoamino and diamino compounds to chain extend and chain terminate the prepolymer. This patent also addresses the change of heat resistance over time, with respect to heat activation.

U.S. Pat. No. 5,608,000 to Duan et al., discloses aqueous dispersion adhesives that have high heat resistance and low activation temperature. To attain these properties, chain extension of a prepolymer made from a diisocyanate and a mixture including a sulfonate-pendant polyester polyol, a hydroxy carboxylic acid, and a low molecular weight diol is required. Also, the only examples showing excellent heat resistance, defined as no failure at all, are samples prepared using a process in which acetone, a common organic solvent, is added.

U.S. Pat. No. 5,703,158 to Duan et al., as well as related PCT Publication No. WO 95/08583 to H. B. Fuller Licensing & Financing, Inc., disclose aqueous dispersions, and processes for making such dispersions, that contain polymers having either sulfonate or a mixture of sulfonate and carboxylate groups. These patents also discuss the reduction in crystallization of adhesive formulations containing TMXDI.

Other publications, such as *TMXDI® (Meta) Aliphatic Isocyanate, The Choice for Aqueous Polyurethane Dispersions*, December 1999, have disclosed that TMXDI may be used in prepolymers for dispersions in coating applications. However, those prepolymers can not typically be used as adhesives because the temperature needed to activate them, greater than about 100° C., is too high for practical use.

Many other publications describe polyurethane polymers or prepolymers used in dispersions, or the dispersions themselves, as well as the process of making such polymers, prepolymers, or dispersions. Examples of such publications include U.S. Pat. Nos. 4,147,679; 4,528,323; 4,558,090; 4,914,148; 5,155,163; 5,494,960; and 5,907,012.

It is desirable to find a polymer composition useful for adhesive applications, which does not require the addition of organic solvent and which has excellent heat activation and resistance properties. In addition, it is beneficial to have the ability to control the heat resistance of such dispersions further by manipulating the molecular architecture of the polymer in the dispersion.

SUMMARY OF THE INVENTION

The present invention relates to polymer having controlled branching formed from the reaction product of a prepolymer and a chain extender, which prepolymer is itself formed from the reaction product of a mixture of a non-self-associating isocyanate component, a diol component having a molecular weight from about 1500 to 6000 grams/mole, and present in an amount greater than about 50% by weight based on the total weight of the prepolymer and an ion-forming compound. The chain extender comprises an amine-containing compound and is present in an amount sufficient to react with at least about 99% of the isocyanate groups present after the prepolymer has been formed. The controlled branching of the polymer comprises at least one of:

a hydroxy-functional component having hydroxyl functionality greater than 2.0 and having a molecular weight from about 700 to 2000; or a low molecular weight component having more than two hydroxyl groups.

Advantageously, the polymer can also have a substantial lack of uncontrolled branching.

In one embodiment, the non-self-associating isocyanate component includes TMXDI. In another embodiment, the ion-forming compound contains at least one carboxylic acid group. In a preferred embodiment, the carboxylate content is from about 1% to 10%, preferably from about 3.5% to 8%, more preferably from about 4% to 6%, by weight of the ion-forming compound, based on the total weight of the polymer after being chain extended.

The present invention is also directed to a process for preparing an adhesive, which comprises:

reacting a mixture of a non-self-associating isocyanate component, a diol component having a molecular weight from about 1500 to 6000 grams/mole, and present in an amount greater than about 50% by weight based on the total weight of the prepolymer and an ion-forming compound, to form a polyurethane prepolymer;

neutralizing an ion-forming moiety on the prepolymer; and chain extending the prepolymer with an amine-containing compound so that the polymer component, which amine-containing component is present in an amount sufficient to react with at least about 99% of the isocyanate groups present after the prepolymer has been formed, wherein the controlled branching of the polymer comprises at least one of:

a hydroxy-functional component having hydroxyl functionality greater than 2.0 and having a molecular weight from about 700 to 2000; or a low molecular weight component having more than two hydroxyl groups.

The present invention also relates to an adhesive for bonding together two substrates comprising any of the polymers of the present invention or polymers that can be made by a process of the present invention.

DETAILED DESCRIPTION OF THE PRESENT INVENTION

Definitions

The term "solvent," as used herein, should be understood to mean any chemical compound, preferably a liquid, that has the capability of dissolving components that are added to it. "Solvent" herein does not refer to or include water.

The term "molecular weight", as used herein means number average molecular weight.

The term "low molecular weight," as used herein, refers to molecular weights not more than about 400 grams/mole.

The term "polyol," as used herein, refers to a compound comprising three or more hydroxyl groups available for reaction.

The term "polyfunctional," as used herein in reference to a compound, refers to the presence of more than two functional groups capable of participating in a reaction with other components. Based on the present disclosure and the context of the usage of this term, it should be obvious to those of ordinary skill in the art with which other components the functional groups are capable of reacting.

The term "solvent-free," as used herein in reference to a composition of matter, indicates that no external solvent component has been added to the composition at any time. It should be understood by one of ordinary skill in the art that residual solvents may be present inherently in commercially available or synthesized products, which inherent presence is not precluded by use of the term "solvent-free."

The phrase "controlled branching," as used herein in reference to the architecture of a polymeric compound, indicates only branching that results from deliberate incorporation of polyfunctional components into a polymeric compound and not branching defined herein under the phrase "uncontrolled branching," which may result from pre-polymerization associations, complexes, or other reactions, from side reactions occurring during polymerization, from post-polymerization reactions involving unreacted functional groups, from degradation or reactions resulting therefrom, and/or from any reaction of difunctional components that results in any non-linear polymer propagation.

The phrase "substantial lack of," as used herein, means having less than about 10% of, preferably less than about 5% of, more preferably less than about 1% of, most preferably completely free of, any given element.

The phrase "non-self-associating isocyanate "component," as used herein, refers to any tertiary isocyanate component that does not substantially self-condense to form dimer or multimer structures.

The term "about," as used herein when referring to a range of values, should be understood to apply to either value or both values in the range.

The phrase "heat activation temperature" as used herein is defined as the minimum temperatures that provided at least 50% fiber tear in Kraft paper as described by the procedure in Example 6.

The patents and publications referred to herein are hereby incorporated by reference to the extent necessary to understand the present invention.

The present invention relates compositions, processes, and particularly adhesives and methods of making and using same. The present invention is directed to the incorporation of branching in either prepolymer hard or soft segments. Utilizing controlled branching, increased heat resistance can be provided without significantly increasing the heat activation temperature.

One aspect of the present invention relates to a polymer component made by a process that includes forming the polymer component by the reaction product of a prepolymer and a chain extender, and optionally a chain terminator. The prepolymer is formed by the reaction of an isocyanate compound, a diol component having a molecular weight from about 1500 to 6000 grams/mole and present in an amount greater than about 50% by weight based on the total weight of the prepolymer and an ion-forming compound. The hydroxy-functional component and the ion-forming compound may be the same compound, although they are preferably two different compounds.

In a preferred embodiment, the isocyanate compound is present in molar excess, compared to the amount of all the hydroxyl (OH) components. In a more preferred embodiment, the isocyanate compound is present in an amount to provide a NCO:OH ratio of about 1.4:1 to 1.8:1.

In another preferred embodiment, the chain extender is present in an amount sufficient to react with at least about 99% of the isocyanate groups present after the prepolymer has been formed. Preferably, the ion-forming compound is present in an amount such that, when neutralized, the ionic moieties formed increase the dispersability of the polymer component in an aqueous solution. In one embodiment, the polymer component contains from about 1 gram to 10 grams, preferably from about 3 grams to 8 grams, more preferably from about 4 grams to 7 grams of ion-forming compound per 100 grams of the polymer component.

In one embodiment, the ion-forming compound is neutralized to form an ionic moiety. In another embodiment, the ion-forming compound preferably contains at least one carboxylic acid group. In a preferred embodiment, the ion-forming compound contains a carboxylic acid such as dimethylol propionic acid (DMPA). In that embodiment, neutralization of the compound capable of forming an ionic moiety would therefore result in a carboxylate anion. Preferably, the ion-forming compound does not introduce any sulfonic acid or sulfonate groups into the polymer component. The ion-forming compound may be neutralized with any suitable neutralizing agent. For example, when the group is a carboxylic acid, the neutralizing agent may advantageously be any Lewis base capable of ionizing the carboxylic acid and forming a carboxylate anion, which corresponding cation is preferably a quaternary ammonium ion. Preferably, the neutralizing agent is a tertiary amine, more preferably a trialkylamine, such as triethylamine (TEA). In an alternate embodiment, the corresponding cation can be a metal cation, such as, for example, sodium, lithium, or potassium.

In a preferred embodiment, the neutralization of the ion-forming compound is performed after the prepolymer is formed. Also, when the polymer component is present in a dispersion, the neutralizing agent is preferably present in an aqueous phase to which the prepolymer is added.

The isocyanate compound is preferably a non-self-associating isocyanate component, for example, such as TMXDI. In a preferred embodiment, the isocyanate compound is TMXDI. The presence of a non-self-associating isocyanate component in the prepolymer of the present invention advantageously yields polymer components with higher heat resistance temperatures and lower heat activation temperatures, preferably one or both by at least about 5° C., more preferably one or both by at least about 10° C., most preferably one or both by at least about 20° C., in comparison to a polymer component made with an isocyanate component capable of self-association or to a polymer component to which solvent other than water is added at some point.

In one embodiment, the polymer component of the present invention has a heat activation temperature of less than about 100° C., preferably less than about 95° C., more preferably less than about 90° C., less than about 80° C. or even less than about 70° C. In another embodiment, the polymer component of the present invention has a heat activation temperature of less than about 60° C.

In another embodiment, the polymer component of the present invention has a heat resistance temperature of greater than about 70° C., preferably greater than about 80° C. In another embodiment, the polymer component of the present invention has a heat resistance temperature of greater than about 90° C. or about 100° C., and preferably greater than about 110° C.

In a preferred embodiment, the diol component may advantageously include a polyether diol or a polyester diol. In another preferred embodiment, the molecular weight of this component may be from about 2000 to 5000 grams/mole. Preferably, the diol component can include a polyester diol. In a preferred embodiment, this polyester diol has a structure that is similar to one made from the reaction product of a $C_2$ to $C_6$ alkanediol and adipic acid, preferably hexanediol or butanediol. In another preferred embodiment, the molecular weight of the polyester diol is from about 2000 to 4000 grams/mole.

The amount of diol present is greater than about 50% by weight, preferably greater than about 55% by weight, or greater than about 60% by weight, based on the total weight of the prepolymer.

Preferably, a non-sulfonated diol component is used in the present invention.

Any suitable chain extender available to those of ordinary skill in the art can be used with the polymer component of the present invention. Preferably, the chain extenders include amine-containing or hydroxyl-containing moieties. In a preferred embodiment, the chain extenders include amine-containing compounds, preferably one or more diamines. Exemplary amine-containing compounds include, but are not limited to, straight-chain or branched alkylene diamines, such as ethylene diamine (EDA), methyl pentamethylene diamine, and the like; hydroxylamino-compounds and mixtures thereof.

In a preferred embodiment, when the compound capable of forming an ionic moiety is neutralized to form a carboxylate anion, the carboxylate content should be from about 1% to 10%, preferably from about 3.5% to 8%, more preferably from about 4% to 6%, by weight of the compound capable of forming an ionic moiety as compared to the total weight of the chain extended polymer.

Optionally, the prepolymer may be chain terminated as well as chain extended. When this occurs, typically a chain terminator will be added at the same time as the neutralizing agent. In a preferred embodiment, when the polymer component is to be present in a dispersion, the chain terminator and the neutralizing agent will both be added to an aqueous phase to which the polymer component is added.

The chain terminating agent may be any compound that effectively reacts with only one isocyanate group per molecule, which serves to effectively endcap the polymer and which effectively halts polymer propagation or chain extension of the prepolymer at that end of the molecule. Suitable chain terminators can include any amine-containing compound which has one isocyanate-reactive group that reacts with isocyanate much more quickly, e.g., at least 5 times faster, preferably at least 10 times faster, than any other isocyanate-reactive moiety present on the compound. For example, such compounds generally contain a primary amine group and a hydroxyl group, but may also contain only an amine group or only a hydroxyl group and no other isocyanate-reactive moiety. Exemplary chain terminators include, but are not limited to aminoalcohols, for example, aminoethanol or aminomethyl propanol, and monoamines, such as straight-chain or branched alkylamines. Another aspect of the present invention relates to a polymer component having controlled branching. In the case of polyurethane or polyurethaneurea polymers, controlled branching can be achieved through the incorporation of polyfunctional components into the polymer-forming or prepolymer-forming reaction.

The polymer components of the present invention typically contain soft segments and hard segments, as is well known by those of ordinary skill in the art. The soft segment generally encompasses polymeric diols or polyols, whereas the hard segment generally encompasses the reacted isocyanates and any other low molecular weight components bonded to the reacted isocyanates.

The polyfunctional components facilitate controlled branching in the hard segment and the soft segment of the polymer component of the present invention. The present invention identifies four categories of controlled branching in the polymer component that can be effected by incorporating different polyfunctional ingredients into the polymer formulation. When introducing controlled branching into the polymer component, the location of the branch points is based on the category of branching that is desired. Controlled branching of the polymer component of the present invention may include branch points in categories A and B listed below. In a preferred embodiment, the controlled branching points present in the polymer component of the present invention include branch points from category A.

Branch category A includes branch points present in the hard segment of the polymer component when a low molecular weight component having more than two hydroxyl moieties is added to the mixture which reaction product forms the prepolymer. Such a compound is called herein a polyfunctional hydroxyl compound. Exemplary polyfunctional hydroxyl compounds for this use include, but are not limited to, triols, such as trimethylolpropane and the like, and higher functionality polyols.

Branch category B includes branch points present in the soft segment of the polymer component whereby a hydroxy-functional component having hydroxyl functionality greater than 2.0 and a molecular weight from about 700 to 2000 is included in the polymer. Exemplary components for this use include, but are not limited to, polyether polyols and polyester polyols, such as those sold under the trade name FOMREZ, such as FOMREZ 1066-187, commercially available through Crompton Corporation.

Branch category C includes branch points present in the hard segment of the polymer component when the chain extender includes a polyfunctional amine-containing component. Exemplary polyfunctional amine-containing compounds for this use include, but are not limited to, triamines, for example, dialkyltriamines, such as diethyltriamine, and the like, higher functionality polyamines, and mixtures thereof.

Branch category D includes branch points present in the hard segment of the polymer component when the isocyanate compound includes a polyfunctional isocyanate compound. Exemplary polyfunctional isocyanate compounds for this use include, but are not limited to, triisocyanates, higher functionality polyisocyanates, and mixtures thereof In a preferred embodiment, the polyfunctional isocyanate compound includes a non-self-associating isocyanate compound.

The polymer components of the present invention are formed as dispersions, among other forms. Preferably, especially when the desired end-use is as an adhesive for facilitating bonding between two substrates, the polymer component is present in the form of a dispersion, preferably an aqueous dispersion, more preferably a solvent-free aqueous dispersion. The polymer component can also be dried to form films, powders or re-dissolved in solvent.

Furthermore, the prior art does not differentiate between self-associating and non-self associating isocyanates concerning their effect on heat activation temperature. The present inventors have found that non-self associating isocyanates, such as TMXDI, provides a significant decrease in heat activation temperature versus either isophorone diisocyanate (IPDI) or hydrogenated diphenylmethane diisocyanate ($H_{12}MDI$) as shown in Example 6 below.

Moreover, there is also little discussion in the literature about the impact of isocyanate choice on heat resistance. In the present invention, no apparent relationship was found between higher heat activating temperature and heat resistance temperatures comparing non-self-associating with self-associating isocyanates. Examples 6 and 7 below shows that the higher heat activation temperatures for IPDI and $H_{12}MDI$ do not translate into higher heat resistance properties. In fact, TMXDI provided the highest heat resistance relative to heat activation temperature.

The literature also teaches that tensile and modulus properties can be increased by adding short chain diols, adding multifunctional polyols (functionality>2) to the backbone, or trifunctional amines during crosslinking (Product Literature: TMXDI® (META) Aliphatic Isocyanate, Cytec Industries Inc. 1994). Increasing either the ionic content of the backbone or increasing the amount of hard segment from urea linkages, which can be obtained by increasing the NCO:OH ratio in the prepolymer stage, are known methods of increasing heat resistance. These methods suffer, however, from the problem that increasing the ionic content of the prepolymer greatly increases its viscosity and makes it more difficult to disperse in the neutralizing solution. Increasing the NCO:OH ratio also increases the expense of the resulting dispersion, since the diisocyanate is normally the most expensive raw material. In addition, increasing the NCO:OH ratio decreases the peel strength of the system. The present invention is directed to the incorporation of branching in either prepolymer hard or soft segments. Utilizing controlled branching, increased heat resistance can be provided without significantly increasing the heat activation temperature.

Furthermore, the present inventors have determined that incorporation of additional branching during chain extension is detrimental, causing both an increase in the heat activation temperature and a decrease in the heat resistance.

The amount of the hydroxy-functional component having hydroxyl functionality greater than 2.0 and a molecular weight from about 700 to 2000 present in the prepolymer is from about 4% to 10%, preferably from about 5% to 8% by weight, based on the total weight of the prepolymer.

The amount of the low molecular weight component having more than two hydroxyl groups present in the prepolymer is from about 0.1 to 3.5%, preferably from about 0.5% to 2% by weight, based on the total weight of the prepolymer.

The use a non-self-associating isocyanate component, such as TMXDI, simplifies the preparation of solvent-free dispersions, because, among other reasons, heat can be used instead of solvents to reduce the prepolymer viscosity during the dispersion step. Adhesives prepared from a non-self-associating isocyanate, such as TMXDI, provide a lower heat activation temperature relative to other aliphatic isocyanates.

An advantage of the polymers of present invention is that their heat activation temperature remains stable for at least about six months. It is believed that these polymers have more stable heat activation temperatures over time than other isocyanate-containing polymers especially when the present polymers are applied as films to plastic substrates.

The substantial lack of side reactions with the present non-self-associating isocyanate also allows the controlled incorporation of structure modifiers into the backbone polymer of the dispersion. The present invention allows an increase in the range between the activation temperature and the heat resistance temperature of adhesives with a substantial lack of external crosslinking or curing agents, preferably in the absence of external crosslinking or curing agents.

Preparation of Polymer

The use of a non-self-associating isocyanate monomer provides a practical method for preparing dispersions without the use of any solvent. The tertiary isocyanate, m-tetramethylxylylene diisocyanate, used in this work is commercially available as TMXDI® (META) aliphatic isocyanate from Cytec Industries Inc. It does not undergo the typical self-condensation reactions of primary and secondary isocyanates to form allophanates, biurets, or isocyanurates. The steric hindrance of the methyl groups also makes reaction with a carboxylic acid group very slow even at a temperature of 125° C. This lack of side reactions allows the prepolymer synthesis to be run at temperatures of about 120° C. to 130° C. with a substantial lack of crosslinking reactions occurring, preferably without any crosslinking reactions occurring. The higher temperature, along with inherently lower polymer viscosities relevant to other isocyanates, facilitates preparation of prepolymers and dispersion with a substantial lack of solvent, preferably without any solvent.

There are a number of process details that are recommended in order to maximize the advantages of using TMXDI for solvent-free dispersions. A practical problem in producing solvent-free dispersions is the incorporation of the high-melting solid carboxylic acid containing monomer, dimethylol propionic acid (DMPA). When using the tertiary isocyanate, the isocyanate and polyester or polyether diols are combined and the DMPA added. The mixture is then heated to about 90° C. to 95° C. and maintained at that temperature until the DMPA dissolves into the mixture. The reaction between the tertiary isocyanate and the hydroxyl group is sufficiently slow to allow the carboxylic acid-containing compound to more completely dissolve and catalyze the reaction. An exotherm is observed once the DMPA dissolves, and the reaction temperature is maintained from about 120° C. to 130° C. for about 1 to 3 hours, or until a stable weight percent NCO value is achieved. Usually, this measured value is slightly lower than the theoretical value. The prepolymer is added hot to the aqueous amine solution in the dispersion step. Prepolymer temperature is typically from about 85° C. to 115° C., depending on its viscosity characteristics. Preferably, as long as the bulk water temperature is maintained below 40° C., the reaction between the tertiary isocyanate and water is slow enough to be ignored. In fact, the dispersed prepolymer can be held for several hours prior to chain extension with very little loss of NCO. The chain extension amine can then be added, preferably above about 1:0.85 NCO:NH stoichiometry, more preferably at about 1:0.99 NCO:NH.

In addition to providing a simpler method for preparation of solvent-free dispersions, TMXDI tertiary isocyanate also provides lower heat activation temperatures for heat activated adhesives. Without being bound by theory, this is believed to be related to the weaker hydrogen bonding in the polymers. This weaker bonding reduces the tendency of polyurethane polymers containing TMXDI to phase separate into hard and soft segments, and lessens their tendency to crystallize. The use of TMXDI affords an adhesive polymer film that has both a lower activation temperature, and one that remains stable over time. Heat activation temperatures of applied adhesive films prepared from primary or secondary isocyanate containing dispersions usually increase upon aging, whereas compositions prepared according to the invention usually do not increase upon aging, after at least six months or more. A further advantage that is observed with dispersions prepared from this tertiary isocyanate is the increased ability to bond to low surface energy substrates.

EXAMPLES

Example 1

Non-branched Polyurethaneurea Dispersion Formulations with TMXDI, IPDI and $H_{12}$MDI A polyurethane prepolymer was formed by mixing 65.67 grams of Rucolex S105-55, a hexanediol/adipate polyester diol having a molecular weight of about 2,000 grams/mole and commercially available from Bayer Corporation, and 28.33 grams of TMXDI in a flask equipped with a stirrer, a thermometer, and under dry nitrogen. The mixture was then heated. When the temperature of the mixture reached about 75° C., 6 grams of dimethylol propionic acid was added. Heating was continued to about 95° C., where an exotherm occurred. The exotherm was allowed to heat the reaction to about 125° C., which temperature was maintained for at least two hours. The polyurethane prepolymer was formed when the reaction was substantially completed, which was determined to be when the actual isocyanate content was slightly below the theoretical NCO content (for this formulation, 3.05%, as compared to 3.16% theoretically). The prepolymer was then cooled to about 95° C. A dispersing reactor was charged with 227.3 grams of deionized water and 4.61 grams of triethylamine to form a neutralizing solution. To the neutralizing solution, while being vigorously agitated, was added the hot prepolymer to form a dispersion, which was then cooled to, and maintained at, a reaction temperature of about 30° C. to 35° C. After about 30 minutes, 2.18 grams of ethylene diamine and 6.54 grams of additional deionized water were added. A polyurethane dispersion of 30.4% solids was obtained.

Prepolymers utilizing isocyanate compounds IPDI and $H_{12}$MDI were also synthesized according to the above procedure except that they were prepared at a temperature below 90° C., and the amounts of reactants were adjusted to maintain the same NCO:OH ratio as used for the TMXDI dispersion. Dispersion of these prepolymers into solution of aqueous amine was much more difficult, and chain extension had to begin immediately. Uncontrolled branching may have occurred during the preparation of these samples. All samples were prepared to obtain about 35% solids.

Example 2

Branch Points (A) in Hard Segment from Addition of About 1% TMP

A polyurethane prepolymer was formed by mixing 61.40 grams of Rucolex S105-55, 1 gram of trimethylolpropane and 31.60 grams of TMXDI in a flask equipped with a stirrer, a thermometer, and under dry nitrogen. The mixture was then heated. When the temperature of the mixture reached about 75° C., 6 grams of dimethylol propionic acid was added. Heating was continued to about 95° C. where an exotherm occurred. The exotherm was allowed to heat the reaction to about 125° C., which temperature was maintained for at least two hours. The polyurethane prepolymer was formed when the reaction was substantially completed, which was determined to be when the actual isocyanate content was slightly below the theoretical NCO content (for this formulation, 3.36%, as compared to 3.53% theoretically). The prepolymer was then cooled to about 95° C. A dispersing reactor was charged with 227.3 grams of deionized water and 4.61 grams of triethylamine to form a neutralizing solution. To the neutralizing solution, while being vigorously agitated, was added the hot prepolymer to form a dispersion, which was then cooled to, and maintained at a reaction temperature of about 30° C. to 35° C. After about 30 minutes, 2.18 grams of ethylene diamine and 6.54 grams of additional deionized water were added. A polyurethane dispersion of 39.8% solids was obtained.

Example 3

Branch Points (A+C) in Hard Segment from Addition of About 1% TMP and from Replacement of 50% EDA with DETA A polyurethane prepolymer was formed by mixing 61.40 grams of Rucolex S105-55, 1 gram of trimethylolpropane and 31.60 grams of TMXDI in a flask equipped with a stirrer, a thermometer, and under dry nitrogen. The mixture was then heated. When the temperature of the mixture reached about 75° C., 6 grams of dimethylol propionic acid was added. Heating was continued to about 95° C., where an exotherm occurred. The exotherm was allowed to heat the reaction to about 125° C., which temperature was maintained for at least two hours. The polyurethane prepolymer was formed when the reaction was substantially completed, which was determined to be when the actual isocyanate content was slightly below the theoretical NCO content (for this formulation, 3.30%, as compared to 3.53% theoretically). The prepolymer was then cooled to about 95° C. A dispersing reactor was charged with 223.9 grams of deionized water and 4.61 grams of triethylamine to form a neutralizing solution. To the neutralizing solution, while being vigorously agitated, was added the hot prepolymer to form a dispersion, which was then cooled to, and maintained at a reaction temperature of about 30° C. to 35° C. After about 30 minutes, 1.18 grams of diethylenetriamine, (DETA), and 3.54 grams of additional deionized water were added. After another 15 minutes, 1.35 grams of ethylene diamine, (ETA), and 4.05 grams of additional deionized water were also added. A polyurethane dispersion of 30.7% solids was obtained.

Example 4

Branch Points (B) in Soft Segment from Addition of Pendant-Ester-Containing Polyester Polyol A polyurethane prepolymer was formed by mixing 56.61 grams of Rucolex S105-55, 6.67 grams of FOMREZ 1066-187, a hexanediol/trimethylol/adipate polyester triol having a molecular weight of about 900 grams/mol and commercially available from Crompton Corporation, and 30.73 grams of TMXDI in a flask equipped with a stirrer, a thermometer, and under dry nitrogen. The mixture was then heated. When the temperature of the mixture reached about 75° C., 6.0 grams of dimethylol propionic acid was added. Heating was continued to about 95° C., where an exotherm occurred. The exotherm was allowed to heat the reaction to about 125° C., which temperature was maintained for at least two hours. The polyurethane prepolymer was formed when the reaction was substantially completed, which was determined to be when the actual isocyanate content was about 3.30%. The prepolymer was then cooled to about 95° C. A dispersing reactor was charged with 227.3 grams of deionized water and 4.61 grams of triethylamine to form a neutralizing solution. To the neutralizing solution, while being vigorously agitated, was added the hot prepolymer to form a dispersion, which was then cooled to, and maintained at, a reaction temperature of about 30° C. to 35° C. After about 30 minutes, 2.14 grams of ethylene diamine and 6.4 grams of additional deionized water were added. A polyurethane dispersion of 29.0% solids was obtained.

Example 5

Branch Points (B+C) in Hard and Soft Segment from Addition of Pendant-Ester-Containing Polyester Polyol and from Replacement of 50% EDA with DETA A polyurethane prepolymer was formed by mixing 56.61 grams of Rucolex S105-55, 6.67 grams of FOMREZ 1066-

187, and 30.73 grams of TMXDI in a flask equipped with a stirrer, a thermometer, and under dry nitrogen. The mixture was then heated. When the temperature of the mixture reached about 75° C., 6.0 grams of dimethylol propionic acid was added. Heating was continued to about 95° C. where an exotherm occurred. The exotherm was allowed to heat the reaction to about 125° C., which temperature was maintained for at least two hours. The polyurethane prepolymer was formed when the reaction was substantially completed, which was determined to be when the actual isocyanate content was about 3.30%. The prepolymer was then cooled to about 95° C. A dispersing reactor was charged with 223.9 grams of deionized water and 4:61 grams of triethylamine to form a neutralizing solution. To the neutralizing solution, while being vigorously agitated, was added the hot prepolymer to form a dispersion, which was then cooled to, and maintained at, a reaction temperature of about 30° C. to 35° C. After about 30 minutes, 1.35 grams of diethylenetriamine and 4.05 grams of additional deionized water were added. After another 10 minutes, 1.18 grams of ethylene diamine and 3.53 grams of additional deionized water were also added. A polyurethane dispersion of 29.4% solids was obtained.

Example 6

Heat Activation Temperatures of Adhesive Films Prepared from TMXDI, IPDI, and $H_{12}$MDI Dispersions The heat activation temperature of adhesive films from the dispersions in Example 1 was determined using Kraft paper, which is commercially available from Deltapaper Corp. of Levittown, Pa. Adhesive was applied to one strip of paper and dried to a tack-free state. Another strip of paper was placed over it and both heated for 20 sec at 276 KPA, the paper removed from the heated press, cooled for 10 sec, and then the strips were pulled apart and examined for fiber tear. Heat activation temperatures are shown below in Table 1 are defined as the minimum temperatures that provided at least 50% fiber tear (FT) in the paper strip. Adhesives prepared from hexanediol-adipate/TMXDI provided 10° C., and >60° C., lower activation temperature relative to IPDI- and $H_{12}$MDI-containing dispersions respectively, while adhesives prepared from butanediol-adipate/TMXDI provided at least a 40° C., lower activation temperature relative to IPDI and $H_{12}$MDI-containing dispersions. No change in activation temperature was observed when TMXDI adhesive coated substrates were allowed to age for six months prior to bonding. Table 1 below shows the % fiber tear of samples at various temperatures.

TABLE 1

Heat activation temperatures of adhesive films prepared from TMXDI, IPDI, and $H_{12}$MDI dispersions.

| Substrate: | Virgin Kraft Paper #40, product of Delta Paper Co., 16 g/m² coated weight, 2.54 cm width |
|---|---|
| Activation Conditions: | Adhesive to neat paper, Heated press, 20 sec. @ 276 KPa, 10 sec. cool down |

| | Hexanediol Adipate | | | Butanediol Adipate | | |
|---|---|---|---|---|---|---|
| | TMXDI | IPDI | $H_{12}$MDI | TMXDI | IPDI | $H_{12}$MDI |
| 40° C. | 10% | 0% | 0% | 0% | 0% | 0% |
| 50° C. | 20% | 0% | 0% | 10% | 0% | 0% |
| 60° C. | 45% | 10% | 0% | FT | 0% | 0% |

TABLE 1-continued

Heat activation temperatures of adhesive films prepared from TMXDI, IPDI, and $H_{12}$MDI dispersions.

| 70° C. | FT | 30% | 0% | | 0% | 0% |
|---|---|---|---|---|---|---|
| 80° C. | | FT | 5% | | 20% | 0% |
| 90° C. | ↓ | | 10% | | 30% | 0% |
| 100° C. | | | 25% | | FT | 10% |
| 120° C. | | ↓ | 40% | ↓ | | FT |

FT = Heat activation temperature where >50% fiber tear (FT) is observed

Example 7

Bond Strength of TMXDI, IPDI, and $H_{12}$MDI Dispersion Films on PVC Substrates The lower heat activation temperature provides advantages when bonding temperature sensitive substrates such as polyvinylchloride (PVC) see Table 2 below.

TABLE 2

Bond Strength of TMXDI, IPDI, and $H_{12}$MDI dispersion films on PVC

| Prepolymer: | Polyester Mw 2000, NCO/OH = 1.6, DMPA = 4.5% |
|---|---|
| Dispersion: | Neutralized with TEA, chain extended with EDA |
| Substrate: | PVC film CQ 6406, product of OxiChem Surface tension 36 dynes/cm 2.54 cm width, 9.5 g/m² coat weight |
| Activation Conditions: | Heated press, 80° C., 20 sec. @ 276 KPa |
| T-Peel: | 12.7 cm/min. separation speed |

| | Hexanediol Adipate | | | Butanediol Adipate | | |
|---|---|---|---|---|---|---|
| | TMXDI | IPDI | $H_{12}$MDI | TMXDI | IPDI | $H_{12}$MDI |
| | Adhesive to Neat Film | | | | | |
| Initial N/cm | SF 12.1 | 2.8 | 1.8 | SF 12.1 | 3.2 | 2.6 |
| 24 hr N/cm | SF 11.4 | 3.3 | 2.3 | SF 13.1 | 4.2 | 3.0 |
| | Adhesive to Adhesive | | | | | |
| Initial N/cm | SF 12.3 | 6.3 | 3.3 | SF 12.6 | 6.7 | 4.9 |
| 24 hr N/cm | SF 12.3 | 8.1 | 4.6 | SF 13.1 | 6.0 | 5.6 |

SF—substrate failure

Both TMXDI based dispersions heat activated sufficiently well at 80° C. to provide substrate failure in T-peel testing while none of the dispersions prepared from the other isocyanates were able to heat activate enough to obtain substrate failure under the same test conditions.

Example 8

Bond Strength of TMXDI, IPDI, and $H_{12}$MDI Dispersion Films on Cotton Substrate The bond strength of adhesive films prepared from the dispersions of Example 1 was determined on cotton web using the activation temperature determined in Table 1. The TMXDI based dispersions gave superior bond strength compared to the other isocyanates even though they were activated at lower temperatures as shown in Table 3 below.

TABLE 3

Adhesive Bond Strength of TMXDI, IPDI, and $H_{12}$MDI based dispersions, assembled adhesive-to-adhesive.

| Substrate: | Web cotton #1682, product of George's Textile, 44 g/m² coat weight, 2.54 cm width |
|---|---|
| Activation Conditions: | Heated press, 20 sec. @ 276 KPa |
| T-Peel: | 12.7 cm/min. separation speed |
| Prepolymer: | 2000 Mw polyester, NCO/OH = 1.6, DMPA = 4.5% |
| Dispersion: | Neutralized with TEA, chain extended with EDA |

| | | Hexanediol Adipate | | | Butanediol Adipate | | |
|---|---|---|---|---|---|---|---|
| | | TMXDI | IPDI | $H_{12}$MDI | TMXDI | IPDI | $H_{12}$MDI |
| Activation Temperature | | 70° C. | 80° C. | 120° C. | 70° C. | 100° C. | 100° C. |
| Initial | N/cm | 11.4 | 6.7 | 9.7 | 9.5 | 6.7 | 6.0 |
| 24 hr | N/cm | 11.0 | 7.0 | 8.8 | 10.7 | 7.0 | 6.8 |
| 7 day | N/cm | 10.0 | 7.5 | 7.7 | 8.4 | 6.8 | 6.5 |
| Bond strength after 24 hour soak | | | | | | | |
| $H_2O$ soak | N/cm | 8.6 | 0.9 | 4.7 | 5.8 | 3.7 | 4.6 |

The TMXDI based systems exhibit excellent and super resistance, as shown by bond strength retention after a 24-hr water soak.

Example 9
Heat Resistance of TMXDI, IPDI, and $H_{12}$MDI Hexanediol/adipate Based Adhesives The heat resistance properties of hexanediol/adipate polyester diol dispersions of Example 1 were determined after bonding strips of cotton web at the appropriate activation temperature (see Table 1). Samples were aged for about 7 days and then hung in an oven for about 10 minutes with a 1-kg weight. The bond line was examined for movement, and the procedure repeated at 10° C. higher temperature. The heat resistance temperature is defined as the temperature where at least about 2 mm bond line movement is observed. The TMXDI based adhesive has a heat resistance temperature of about 50° C. to 60° C. with an activation temperature of about 70° C., while the heat resistance temperatures of the IPDI and $H_{12}$MDI based adhesives were about 40° C., which is significantly lower than the activation temperature of 80° C. and 120° C. respectively.

TABLE 4

Heat resistance of TMXDI, IPDI, and $H_{12}$MDI hexanediol/adipate based adhesives

| Polyester: | 2000 MW hexanediol adipate NCO/OH = 1.6, DMPA = 4.5% |
|---|---|
| Dispersion: | Neutralized with TEA, chain extended with EDA |
| Substrate: | Web cotton #1682, product of George's Textile, 44 g/m² coat weight, 2.54 cm width |
| Activation Conditions: | Heated press, 20 sec. @ 276 KPa |
| Test Conditions: | Sample hung in oven, T-Peel with 1-kg weight, Temperature increased 10° C. after every 10 min. Bond line separation measured in mm |

| | TMXDI | IPDI | $H_{12}$MDI |
|---|---|---|---|
| $T_{Activation}$, ° C. | 70 | 80 | 120 |
| Oven Temp. | Bond Line Movement in Millimeters | | |
| 40° C. | 0 | 0 | 3 |
| 50° C. | 2 | 6 | 45 |
| 60° C. | 3 | 10 | >50 |

TABLE 4-continued

Heat resistance of TMXDI, IPDI, and $H_{12}$MDI hexanediol/adipate based adhesives

| 70° C. | 9 | >50 |
| 80° C. | 27 | |
| 90° C. | >50 | |

Example 10
Effect of Branch Point Site in Polymer on Adhesive and Film Properties Prepolymers prepared from TMXDI and polyester diols are linear due to the substantial lack of side reactions during prepolymer synthesis. A systematic investigation of the effect of branch points at specific sites in the polymer structure is summarized in Table 5.

TABLE 5

Effect of branch point site in polymer on adhesive and film properties

| Dispersions: | Hexanediol adipate based, NCO:OH and ionic content kept constant |
|---|---|
| Branch Point Site | A, B, or C |
| Activation Temp: | Paper, adhesive to neat paper, 9.5 g/m² |
| Heat Resistance | Cotton tape, adhesive to adhesive, 30 g/m² Heat activated @ 90° C., 20 sec @ 276 KPa |

| | Dispersion | | | | |
|---|---|---|---|---|---|
| | I | II | III | IV | V |
| Branch Point | None | A | A + C | B | B + C |

Adhesive Properties

Heat Activation Temp: adhesive to paper, heated 20 sec @ 276 KPa, 10 sec cool down

| 60° C., % fiber tear | 40–50 | 30–40 | 20 | 40 | 5 |
| 70° C., % fiber tear | 50–60 | 50–60 | 30–40 | 50–60 | 10–20 |
| 80° C., % fiber tear | 100 | 80–90 | 50 | 70–80 | 30–40 |
| 90° C., % fiber tear | 100 | 100 | 100 | 100 | 80 |

Heat Resistance - Bond line movement after 10 min @ temp, 1-kg load

| Adhesive Activated at | 60° C. | 70° C. | 80° C. | 70° C. | 90° C. |
| 70° C. oven temp | 0 | 0 | 0 | 0 | 0 |
| 80° C. oven temp | 2–4 | 0 | 2–4 | 0 | 0 |

TABLE 5-continued

Effect of branch point site in polymer on adhesive and film properties

| 90° C. oven temp | >5 | 0 | 5 | 0 | >5 |
|---|---|---|---|---|---|
| 100° C. oven temp | | 2–4 | | >5 | |

This table demonstrates that the addition of branching in the prepolymer increases the heat resistance of the polymer without a significant increase in heat activation temperature. In addition, the data shows that the location of branch points is an important parameter for increasing the heat resistance temperature relative to the heat activation temperature.

In summary, Examples 6 through 9 demonstrate that a non-self-associating isocyanate has higher heat resistance, lower heat activation and better bond strength than self-associating isocyanates like IPDI and $H_{12}MDI$. Furthermore, Example 10 demonstrates that the addition of branching to a non-self-associating isocyanate increases heat resistance without a significant increase in heat activation temperature.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A polymer having controlled branching formed from the reaction product of:
   a prepolymer formed from the reaction product of a mixture of a non-self-associating isocyanate component, a diol component having a molecular weight from about 1500 to 6000 grams/mole and present in an amount greater than about 50% by weight based on the total weight of the prepolymer, and an ion-forming compound;
   and then reacting the prepolymer with a chain extender wherein the chain extender comprises an diamine-containing compound and is present in an amount sufficient to react with at least about 99% of the isocyanate groups present after the prepolymer has been formed, wherein the controlled branching of the polymer comprises at least one of
   a hydroxy-functional component having hydroxyl functionality greater than 2.0 and a molecular weight from about 700 to 2000; or
   a low molecular weight component having more than two hydroxyl groups.

2. The polymer of claim 1, which further has a substantial lack of uncontrolled branching.

3. The polymer of claim 1, wherein the non-self-associating isocyanate component comprises TMXDI.

4. The polymer of claim 1, wherein the ion-forming compound contains at least one carboxylic acid group.

5. The polymer of claim 4, which has a carboxylate content from about 1% to 10% by weight of the compound capable of forming anionic moiety based on the total weight of the polymer.

6. The polymer of claim 1, wherein the amount of the hydroxy-functional component is from about 4% to 10% by weight based on the total weight of the prepolymer.

7. The polymer of claim 1, wherein the amount of the low molecular weight component is from about 0.1% to 3.5% based on the total weight of the prepolymer.

8. The polymer of claim 1, wherein the heat activation temperature of the polymer is less than about 90° C.

9. The polymer of claim 1, which has a heat resistance temperature of greater than about 80° C.

10. An adhesive for bonding together two substrates comprising the polymer of claim 1.

11. A process for preparing an adhesive which comprises forming a polymer dispersion by:
   reacting a mixture of a non-self-associating isocyanate component, a diol component having a molecular weight from about 1500 to 6000 grams/mole and present in an amount greater than about 50% by weight based on the total weight of the prepolymer and an ion-forming compound, to form a polyurethane prepolymer;
   neutralizing an ion-forming moiety on the prepolymer; and chain extending the prepolymer with an amine-containing compound to form the polymer component, which amine-containing component is present in an amount sufficient to react with at least about 99% of the isocyanate groups present after the prepolymer has been formed,
   wherein the controlled branching of the polymer comprises at least one of: a hydroxy-functional component having hydroxyl functionality greater than 2.0 and a molecular weight from about 700 to 2000; or a low molecular weight component having more than two hydroxyl groups.

12. The process of claim 11, which further has a substantial lack of uncontrolled branching.

13. The process of claim 11, wherein the non-self-associating isocyanate component comprises TMXDI.

14. The process of claim 11, wherein the ion-forming compound contains at least one carboxylic acid group.

15. The process of claim 14, which has a carboxylate content from about 1% to 10% by weight of the compound capable of forming an ionic moiety based on the total weight of the polymer.

16. The process of claim 11, wherein the amount of the hydroxy-functional component is from about 4% to 10% by weight based on the total weight of the prepolymer.

17. The process of claim 11, wherein the amount of the low molecular weight component is from about 0.1 to 3.5% based on the total weight of the prepolymer.

18. The process of claim 11, wherein the heat activation temperature of the polymer is less than about 90° C.

19. The process of claim 11, which has a heat resistance temperature of greater than about 80° C.

20. An adhesive for bonding together two substrates comprising a polymer made by the process of claim 11.

21. A polymer formed from the reaction of a prepolymer with a chain extender, wherein said prepolymer is formed from the reaction product of:
   (i) a mixture of a non-self-associating isocyanate component;
   (ii) a diol component having a molecular weight from about 1500 to 6000 grams/mole and present in an amount greater than about 50% by weight based on the total weight of the prepolymer;
   (iii) an ion-forming compound; and
   (iv) a component selected from at least one of: a hydroxy-functional component having hydroxyl functionality greater than 2.0 and a molecular weight from about 700 to 2000 and a low molecular weight component having more than two hydroxyl groups;

and wherein said chain extender comprises an diamine-containing compound and is present in an amount sufficient to react with at least about 99% of the isocyanate groups present after the prepolymer has been formed.

22. The polymer of claim 21, wherein the non-self-associating isocyanate component comprises TMXDI.

\* \* \* \* \*